US 9,394,587 B2

(12) United States Patent
Carr et al.

(10) Patent No.: US 9,394,587 B2
(45) Date of Patent: Jul. 19, 2016

(54) METHOD AND SYSTEM FOR EXTRACTION OF URANIUM USING AN ION-EXCHANGE RESIN

(75) Inventors: John Carr, Victoria (AU); Nikolai Zontov, Victoria (AU); Tony Chamberlain, Victoria (AU)

(73) Assignee: Clean Teq Holdings Limited (AU)

( * ) Notice: Subject to any disclaimer, the term of this patent is extended or adjusted under 35 U.S.C. 154(b) by 215 days.

(21) Appl. No.: 13/985,744

(22) PCT Filed: Feb. 15, 2012

(86) PCT No.: PCT/AU2012/000144
§ 371 (c)(1),
(2), (4) Date: Oct. 29, 2013

(87) PCT Pub. No.: WO2012/109705
PCT Pub. Date: Aug. 23, 2012

(65) Prior Publication Data
US 2014/0044615 A1 Feb. 13, 2014

(30) Foreign Application Priority Data

Feb. 15, 2011 (AU) ................................ 2011900500

(51) Int. Cl.
| C22B 60/02 | (2006.01) |
| C02F 1/42 | (2006.01) |
| C02F 101/00 | (2006.01) |

(52) U.S. Cl.
CPC ......... *C22B 60/0265* (2013.01); *C22B 60/0226* (2013.01); *C02F 1/42* (2013.01); *C02F 2101/006* (2013.01)

(58) Field of Classification Search
None
See application file for complete search history.

(56) References Cited

U.S. PATENT DOCUMENTS

| 4,292,279 A | * | 9/1981 | Reusser | ............... | C01G 43/006 |
| | | | | | 423/15 |
| 4,410,497 A | * | 10/1983 | Otto, Jr. | ............... | C22B 60/0282 |
| | | | | | 299/5 |

(Continued)

FOREIGN PATENT DOCUMENTS

CA 2756128 A1 5/2012

OTHER PUBLICATIONS

Carr, The Clean Teq U-Hisal Process: Extraction of Uranium from Acidic Saline Environments (Mar. 2011).*

(Continued)

*Primary Examiner* — Melissa Swain
(74) *Attorney, Agent, or Firm* — Tarolli, Sundheim, Covell & Tummino LLP

(57) ABSTRACT

The invention discloses a method for recovering uranium from an acidic leach solution or leach pulp in salt water using an amino-phosphorus resin, wherein the liquid phase of the leach solution or leach pulp contains greater than 3 g/L chloride ion in solution. The resin may comprise a functional group comprising an amino phosphonic group, an amino-phosphinic group, an amino phosphoric functional group and/or a combination thereof. According to the invention the leach solution or leach pulp may be generated by in-situ leaching, vat leaching, heap leaching and/or agitated leaching at ambient, elevated temperature and/or elevated pressure conditions in saline or hyper-saline water.

15 Claims, 2 Drawing Sheets

(56) References Cited

U.S. PATENT DOCUMENTS

| | | |
|---|---|---|
| 4,442,231 A | 4/1984 | Kataoka et al. |
| 4,797,264 A | 1/1989 | Inoue et al. |
| 6,165,367 A * | 12/2000 | Partridge ............... B01J 39/12 210/670 |
| 7,390,934 B1 | 6/2008 | Kimura |
| 2007/0209481 A1 * | 9/2007 | Pereira ............... C22B 23/043 75/743 |
| 2012/0125158 A1 | 5/2012 | Rezkallah |

OTHER PUBLICATIONS

Marina Fainerman-Melnikova, et al.; "Uranium Recovery from Saline Solutions with Weak Base Anionic IX Resins"; Publication—by Australian Nuclear Science & Technology Organisation; Conference 2010; 25 pgs.

* cited by examiner

METHOD AND SYSTEM FOR EXTRACTION OF URANIUM USING AN ION-EXCHANGE RESIN

This application is a National Phase Filing of PCT/AU2012/000144, filed Feb. 15, 2012, which claims priority from Australian Application No. 2011900500, filed Feb. 15, 2011, the subject matter of which are incorporated herein by reference in their entirety.

FIELD

THIS INVENTION described herein relates generally to a method of extracting uranium using an amino-phosphorous resin. In particular, the invention is directed to a method of extracting uranium from a chloride containing solution using an ion-exchange resin, although the scope of the invention is not necessarily limited thereto.

BACKGROUND

In the past 5 years there has been a significant increase in the demand of uranium for base load power generation. New mines have been developed to meet this demand. Conventional processing of uranium ores requires leaching the uranium bearing minerals in sulphuric acid or sodium carbonate under oxidising conditions to liberate the uranium as a soluble uranyl sulphate or uranyl carbonate complex. Uranium deposits situated in arid geographical regions require large quantities of desalinated water in the case where ion exchange is selected as the process technology. Large desalination plants have been built and others planned for a number of proposed uranium projects.

Leaching of uranium minerals can be performed by various techniques. If the ore body is below the water table in a confined aquifer then in-situ leaching is possible. In-situ leaching (ISL) is where dilute sulphuric acid is injected into the ore body through a series of injection wells. The acid reacts with the uranium bearing minerals and leaches them into solution. A series of recovery bores then extract the weak acidic solution containing the uranyl sulphate from the aquifer (IAEA, 2001). The pregnant leach solution (PLS) from the recovery bores typically contains 50-200 ppm uranium in solution. This uranium concentration is low compared to conventional agitated tank leaching. In the case of ISL, ion exchange (IX) is normally used to recover and concentrate the uranium from solution. Solvent extraction (SX) can be used for recovery of uranium from ISL liquors, however due to the low uranium concentration in solution it is normally proven to be uneconomic. Once the uranium has been recovered the barren PLS is re-acidified before being re-injected into the bore field. In arid regions the ground water is normally very saline and uranium recovery using resin is not possible.

Heap leaching is also employed to extract uranium from low grade ores. The ore is crushed and stacked into heaps and sulphuric acid or sodium carbonate irrigated on to the heap. The leach solution percolates through the heap and the pregnant leach solution collected in a pond (IAEA, 1993). Again the solution typically contains very low concentrations of uranium (50-200 ppm uranium) and IX is used to recover uranium before the solution is recycled to the heap leach circuit. In countries such as Namibia there are vast amounts of low grade uranium ore amenable to heap leaching. Large desalination plants have been built and more proposed to exploit these deposits.

Hard rock uranium ore bodies or those ore bodies above the water table are processed by conventional open pit or underground mining techniques. These ores are normally crushed and then milled to the correct liberation particle size to ensure maximum extraction is achieved during uranium leaching. Either sulphuric acid or sodium carbonate is normally employed as the leaching reagent. Elevated temperature and pressure can be used to reduce leach residence time or to improve overall uranium leach extraction. Once the ore has been leached the pregnant leach solution is normally recovered through a counter current decantation (CCD) circuit to wash the leach residue and recover the soluble uranium. A large amount of wash water is normally required to ensure a high wash efficiency is achieved. Uranium in solution is then recovered by solvent extraction, ion exchange or precipitation. If high chloride levels are present in solution, which originated from the ore, addition of a chloride oxidant or water used in the process, then ion exchange cannot be used. At elevated chloride levels only solvent extraction or direct precipitation has been available as a technically feasible option. Resin-in-pulp (RIP) can also be employed where the resin is contacted directly with the leach discharge pulp and uranium recovered from the pulp (Gupta & Singh, 2003). This avoids the requirement of a CCD wash circuit. Again RIP is only applicable when chloride concentrations are maintained below 3 g/L in the leach pulp.

Strong base anionic (SBA) resins have been widely adopted as the conventional approach for extraction of uranium from an acidic or alkaline PLS or pulp. An SBA resin has a quaternary amine functional group and chemically adsorbs uranyl sulphate or uranyl carbonate anionic complexes by electrostatic forces. Chloride is also a strong anionic ion and when present in high concentrations it competes with the uranyl complexes. As the chloride concentration increases, loading of uranium onto SBA resins decreases. All SBA resins preferentially load chloride and once the chloride concentration typically exceeds 3.5 g/L then this starts to significantly impact the loading capacity of the ion exchange resin. For example, a strong base anionic (SBA) resin (Dowex 21K) has an equilibrium loading of 20 g $U_3O_8$/L wet settled resin (wsr) loading when contacted with a solution containing 150 ppm $U_3O_8$ and 3.5 g/L chloride at pH 1.8. This loading decreases to 7 g $U_3O_8$/L (wsr) at 7.5 g/L chloride and 4.3 g $U_3O_8$/L (wsr) at 8.3 g/L chloride (La Brooy, 2009). Weak base anionic (WBA) resins containing secondary and/or tertiary amine groups are used when high sulphuric acid concentrations are present after leaching. WBA resins are also susceptible to low loadings when high chloride concentrations are present in solution. Improved methods and/or resins are required.

SUMMARY

The present invention is broadly directed to a method for extracting uranium. Suitably the invention allows extraction to be performed from high chloride solutions. A preferred advantage of the invention is that saline solutions such as, sea water or salty ground water may be used in the extraction. This advantage is of significant cost benefit to a mine site in that it eliminates the requirement for a costly desalination plant.

In one aspect, there is provided a method for recovering uranium from an acidic leach solution or leach pulp in salt water using an amino-phosphorus resin, wherein a liquid phase of the leach solution or leach pulp contains greater than 3 g/L chloride ion in solution.

In a second aspect, there is provided a resin for recovering uranium from an acidic leach solution or leach pulp, the resin comprising an amino-phosphorus resin wherein the resin is used to recover uranium from an acidic leach solution or leach pulp in salt water, wherein the liquor in the leach solution or leach pulp contains greater than 3 g/L chloride ion in solution.

In a third aspect there is provided a system for recovering uranium from an acidic leach solution the system comprising the resin of the second aspect.

In a fourth aspect there is provided a system for performing the method of the first aspect.

According to any one of the above aspects the amino phosphorus resin may comprise an amino phosphonic group, an amino-phosphinic group, amino phosphoric functional group and/or a combination thereof.

According to any one of the above aspects the resin may be contacted with the leach solution or leach pulp in an up-flow, down-flow and/or counter current flow.

According to any one of the above aspects the leach liquor or leach pulp may be generated by in-situ leaching, vat leaching, heap leaching and/or agitated leaching at ambient, elevated temperature and/or elevated pressure conditions in saline or hyper-saline water.

According to any one of the above aspects the leach solution or leach pulp may be obtained by leaching the uranium bearing ore with an acid.

According to any one of the above aspects the acid may comprise sulphuric acid.

According to any one of the above aspects the pH of the acidic leach solution or leach pulp comprises 0.0-5.0.

According to any one of the above aspects a resin residence time in an extraction stage may be between 5 and 30 hours.

According to any one of the above aspects acidic leach pulp may be contacted in a series of vessels each containing a volume of the resin.

According to any one of the above aspects the number of vessels may be between 1-10.

According to any one of the above aspects the source of chloride may originate from addition of a reagent such as sodium chlorate, hypochlorite and/or others.

According to any one of the above aspects the uranium-loaded resin may be stripped with a stripping reagent such as and not limited to water, saline, a carbonate salt, a bicarbonate salt, a sulphate salt, a sulphuric acid, a nitrate salt, a nitric acid or a combination of these.

According to any one of the above aspects the carbonate salt may be sodium carbonate generated through the precipitation of sodium diuranate (SDU).

According to any one of the above aspects the sodium diuranate (SDU) may be contacted with carbon dioxide.

According to any one of the above aspects the carbonate salt may be ammonium carbonate generated by carbonation of ammonia from ammonium diuranate (ADU) production.

According to any one of the above aspects an impurity loaded on the resin can be preferentially scrubbed or selectively stripped using a dilute sulphuric acid, sulphurous acid, and/or water.

According to any one of the above aspects a uranyl peroxide product may be precipitated by adding hydrogen peroxide and/or sodium hydroxide.

According to any one of the above aspects yellowcake product may be produced by calcining.

According to any one of the above aspects the barren resin may be washed with water or high chloride water.

According to any one of the above aspects the stripped or barren resin may be regenerated to sulphate, chloride, nitrate or other anionic forms by contacting the barren resin with a solution of sulphuric acid, sulphate salt, hydrochloric acid, sodium chloride, nitric acid or a combination of these.

According to any one of the above aspects wherein the liquid phase may comprise greater than 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5 28, 28.5, 29, 29.5, 30, 35, 40, 45, 50, 60, 70, 80, 90, 100, 110 or 120 g/L chloride ion in solution.

According to any one of the above aspects the acidic leach solution or leach pulp may be pre-filtered.

The invention also provides a uranium product recovered using the method of the first aspect, the resin of the second aspect or the system or the third or fourth aspect.

The invention also provides a method, resin and system substantially as herein described.

The invention also provides a method, resin and system substantially as herein described with reference to the Figures and/or Examples.

As used herein, except where the context requires otherwise, the term "comprise" and variations of the term, such as "comprising", "comprises" and "comprised", are not intended to exclude further additives, components, integers or steps.

DETAILED DESCRIPTION

Figure 1:
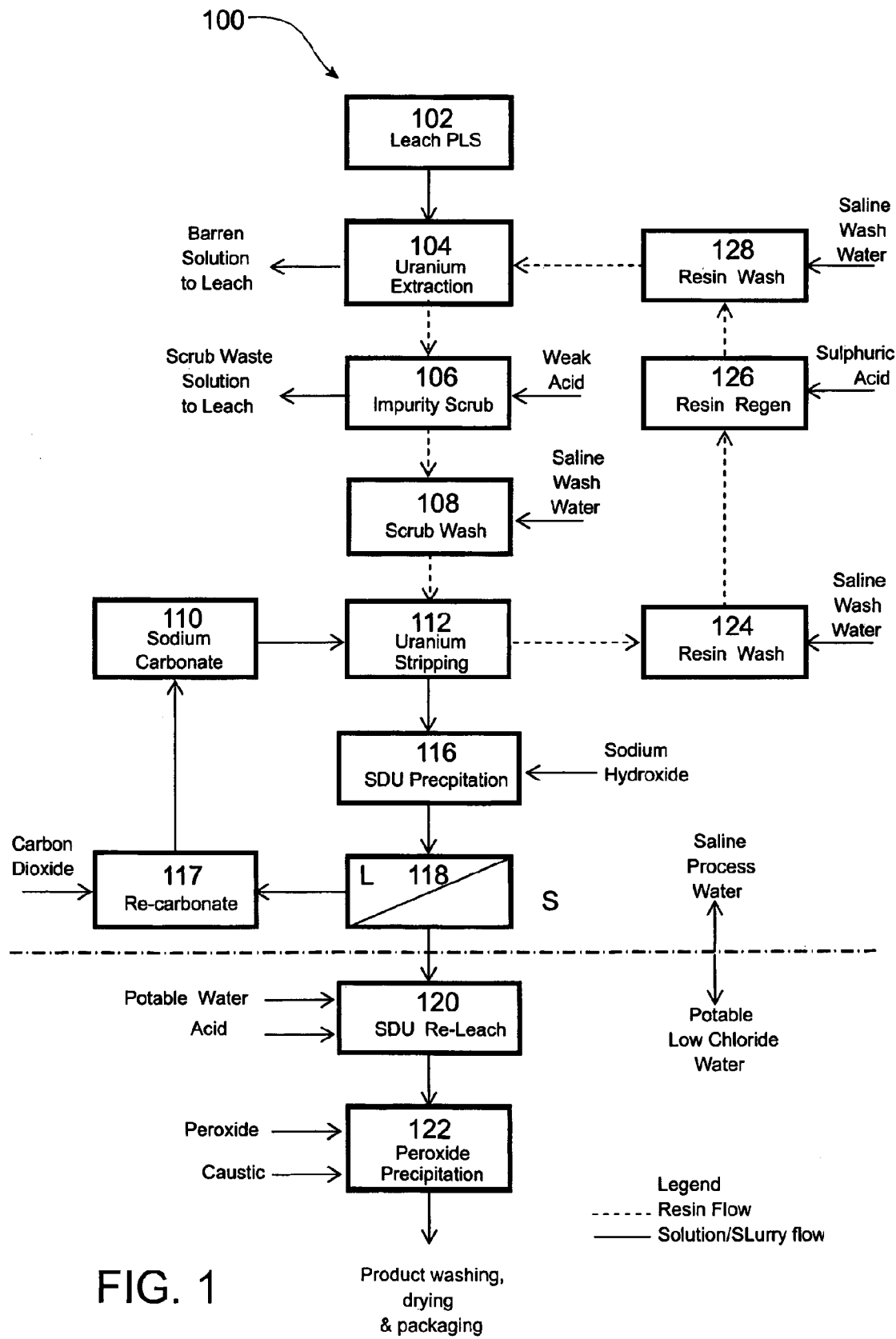
FIG. 1: is a flow diagram showing one embodiment of the method of recovering uranium of the invention with sodium carbonate.

The method outlined in the present invention may be used to recover uranium from acidic leach liquors and pulps. Surprisingly, the inventors have provided a method, resin and system in which recovery can be performed from a solution with a concentration of chloride higher than 3 g/L.

Significantly, the present invention enables the application of resin recovery in arid regions where the ground water or other available water, such as sea water, is normally saline or very saline. Hitherto this has not been possible.

Of great importance the present invention allows the use of seawater or brackish ground water for leaching and recovery by ion exchange significantly reducing the required capital by eliminating the need for a desalination plant.

The present invention also has significant safety advantages. Ion exchange is normally selected as the preferred process option over solvent extraction due to inherent fire risk of solvent extraction and its higher capital cost during initial installation. Prior to the present invention the presence of high soluble chloride levels in the ore or process water has omitted IX as a technically viable process option, without building an expensive desalination plant.

The invention will be described with reference to uranium.

As used herein "salt water" includes sea water, salty or brackish ground water, saline and hypersaline solutions. It is to be understood that without the present invention such salt water would be required to be desalinated before being suitable for extraction of uranium by ion exchange. Based on the teachings herein a person of skill in the art is readily able to identify salt water as opposed to water that is not required to be desalinated for use in extraction of a metal by ion exchange. The salt water may have a chloride concentration greater than 250; greater than 300; greater than 350; greater than 400; greater than 500; greater than 600; greater than 700;

greater than 800; greater than 900; greater than 1000; greater than 2000; greater than 3000; greater than 4000; greater than 5000; or greater than 6000 mg/L.

It is understood that sea water ordinarily contains about 19 g/L of chloride. Accordingly sea water is suitable for the present invention, but the present invention is not so limited.

It is to be understood that the salt water has a chloride concentration suitable to result in a leach solution or leach pulp with a chloride solution comprising greater than 3 g/L chloride ion in solution. The high chloride solution may comprise greater than 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5 28, 28.5, 29, 29.5, 30, 35, 40, 45, 50, 60, 70, 80, 90, 100, 110 or 120 g/L chloride ion in solution.

The leach solution or leach pulp may contain 3 to 1000 g/l chloride ion in solution. In one embodiment the leach solution or leach pulp liquid phase may contain 3 to 120 g/l chloride.

The resin used in the invention is preferably an amino-phosphorous resin. Suitable resins include those comprising a functional group comprising an amino phosphorous group. Examples of these include, but are not limited to an amino-phosphonic group, an amino-phosphinic group, an amino phosphoric functional group, and/or a combination thereof.

Prior to contacting the resin with the pregnant leach solution or leach pulp the method may optionally include a pre-filtration step. The pre-filtration step may be used depending on the amount of suspended solids and/or slimes in the feed solution. In this way the pre-filtration step may be used to ensure low suspended solids so as to not affect the performance of the method. Pre-filtration methods can be sand filtration, clarification, thickening, but are not limited to these.

The pregnant leach solution or leach pulp may originate from any sulphuric acid leach process such as in-situ leach, heap leach or agitated leach process but not limited to these.

In one embodiment the leach lixiviant is sulphuric acid.

The amino-phosphorus resin may be contacted with the resulting acidic pregnant leach solution or leach pulp either as a clarified pregnant leach solution or acidic leach pulp to recover the contained uranium.

The acidic solution or pulp may have a pH range of 0.0 to 5.0.

While performance can vary, extraction systems are typically designed to recover greater than 95% of soluble uranium.

Pregnant leach solution may be contacted with a fixed bed of resin in an up-flow or down flow arrangement or counter currently to the flow of resin, in continuous systems.

Of significant advantage, the barren saline solution can be recycled, as process water to the comminution or leach circuit.

The extraction equipment whereby resin is contacted with uranium-leached solution or pulp and stripping solution includes, but is not limited to batch or fixed bed, carousel, moving packed bed (i.e. Higgins Loop®, Clean-iX® cLX), fluidised bed (e.g. NIMCIX) style contacting equipment and others. The equipment may include some form of clarification or filtration before extraction.

The extraction equipment whereby resin is contacted with uranium-leached slurry or pulp may be, but is not limited to, continuous, carousel or batch Resin-In-Pulp (RIP) or Resin-In-Leach (RIL) systems. The system may include pre-screening of pulp or slurry prior to entering into the resin-contacting equipment.

In the cases where continuous systems (e.g. moving packed bed and fluidised column) are used, resin may be transported by airlifts, mechanical pumps, or eductors but not limited to these.

Resin volume and residence time in extraction stages will be dependent on the process condition for each application. In one embodiment the residence time is between 5 and 30 hours. However, the residence time will be dependent on the resin volume. Based on the teaching herein, a skilled person is readily able to select a suitable residence time based on the resin volume. Similarly, from the teaching herein, a skilled person is readily able to select a suitable resin volume based on the size of the project.

Acidic leach pulp may be contacted in a series of vessels, each containing a volume of resin. The number of contactors will be dependent on the process conditions for each application, but is most likely to be between 3-10 tanks in each series. The agitation of slurry and resin in each contactor can be with mechanical forces (impellers or pumps) or with compressed air. The movement of resin between stages can either be continuous, using resin transport mechanisms between each contactor such as airlifts or mechanical pumps or fixed resin volumes can be in each contactor as in carousel operations.

Interstage screening of leach solution or leach pulp between contactors can be with static screens, vibrating screens, rotating submerged pumping screens, but not limited to these. Pulp can be transported by mechanical pumping, impeller pumping or gravity for plants in cascade arrangements. Resin volumes in each contactor will be dependent on process conditions for each application but is most likely to be between 1-50% v/v per contactor.

Once the resin has been contacted with pregnant leach solution or pulp sufficiently to extract the desired amount of uranium, it is stripped and regenerated in a Stripping stage.

For batch and carousel systems, columns are contacted with a series of different reagents and wash waters through a series of valves and pumps directed to a specific column in a set sequence.

In continuous and pulp systems, uranium-loaded resin (loaded resin) is transported to a dedicated column, whereby it can undergo the stripping procedure outlined below. The transport of resin can either be with airlifts or mechanical pumps or eductors. For pulp systems, the loaded resin is typically screened to remove entrained solids from the resin, prior to stripping and may comprise of a range of screens, including static screens, vibrating screens or trommel screens. Wash or transportation water in these process steps can be saline or hyper-saline water.

Typically the first step in the stripping stage requires the resin to be washed using water (saline) to elutriate any fine particulates remaining on the resin. This is typically done in an elutriation or fluidised wash column, whereby the resin bed is partly expanded through water injection in the bottom of the column at a sufficient superficial velocity to separate resin and solid particles. In fixed or carousel columns, backwashing of the resin bed at high velocities are used. The requirement of this washing step is dependent on the level of solids in the feed solution and the technology selected for extraction and stripping.

Some minor impurities (such as iron, vanadium, zirconium or thorium) may have co-loaded onto the resin and can affect the purity of the final product. These can be scrubbed by contacting the loaded resin with a solution of a weak acid such as, weak sulphuric acid or sulphurous acid in the case of removing iron. Dilute sulphuric acid will remove minimal uranium from the resin. Saline or hyper-saline water may also be used, with pH correction to around 1.5. The scrub step is optional depending on the amount of impurities present. The spent scrub solution is normally sent to leach, as it can contain acid and a small amount of uranium.

After scrubbing, the resin may be washed with water to remove any entrained scrub solution. For systems using sodium diuranate (SDU) and peroxide precipitation, saline water may be used for resin washing. For systems using ammonium diuranate (ADU) producing an ammonium uranyl tricarbonate precipitation product, fresh (low chloride) water may be used for resin washing. The wash water from this step may go to scrub solution make up to recycle any sulphuric acid recovered from the resin bed.

Scrubbed washed resin may be contacted with a stripping solution to strip any uranium loaded onto the resin into solution. The stripping reagents may include carbonate, bicarbonate, sulphate and/or nitrate. These reagents strip the uranium from the resin as uranyl carbonate, uranyl sulphate or uranyl nitrate complexes. The uranium rich product solution is sent to precipitation. The uranium-stripped (barren) resin is sent to resin washing.

Barren resin may then be washed with water to recover any entrained strip solution. High chloride water may be used for this barren resin wash step. For systems using sodium diuranate (SDU) and peroxide precipitation downstream of stripping, wash water from barren resin wash step may go to stripping solution make up to recycle any strip solution recovered. For systems using ammonia precipitation downstream of stripping, barren resin wash water may be sent to leaching or comminution circuits.

The washed, barren resin may be regenerated before be returned to extraction. A regeneration solution such as dilute sulphuric acid may be used to convert the resin back to its sulphate form. Sulphuric acid may be mixed with return high chloride water from the regeneration wash stage to produce a dilute (~5-10% w/w) sulphuric acid regeneration solution. Spent regeneration solution may be sent to leaching to recover any excess acid in solution. After regeneration, the resin may be washed to remove excess regeneration solution, with resulting weak regeneration solution being recycled to regeneration solution make up. High chloride water may be used in this step.

The washed, regenerated resin may then be returned to the extraction stage. Depending on the design of the system, buffer columns for loaded and barren resin may be required. Resin transportation to extraction can use airlifts, mechanical pumps, eductors, compressed air or other methods.

The point at which saline water may no longer be used in the main process stream may occur either when the resin is washed and stripped with a stripping reagent prepared in low chloride water, or by precipitating an intermediate uranium product after stripping, which is washed and repulped in potable water.

Uranium-rich product solutions may be sent to precipitation for yellowcake production. When using sodium carbonate or sodium bicarbonate for the stripping reagent, the product solution containing uranyl carbonate may be precipitated with sodium hydroxide to form SDU. This point in the method provides the segregation between saline and low chloride within the circuit.

The resulting SDU precipitate may be filtered and washed with potable water, which segregates the circuit from saline process conditions. The SDU filtrate may be carbonated to allow sodium carbonate to be generated for uranium stripping in the ion exchange section. Carbon dioxide may be contacted with SDU filtrate to convert all excess sodium hydroxide in to sodium carbonate. The contacting equipment can be through a scrubber or tank. SDU precipitate may be repulped in low chloride water and dissolved in sulphuric acid. The resulting uranyl sulphate may be precipitated with hydrogen peroxide to form a uranyl peroxide product. Sodium hydroxide is used to maintain pH at the optimum peroxide precipitation conditions. Final uranyl peroxide product is thickened, filtered and dried to produce a yellowcake product.

When using ammonium carbonate or ammonium bicarbonate, product solution from ion exchange stripping containing ammonium uranyl tricarbonate solution may be heated with steam to precipitate ADU and generate ammonia and carbon dioxide gas. Vapour may be recovered via a packed bed scrubber for recycling to stripping along with the barren ADU solution after solid-liquid separation. The ADU may be calcined to produce final yellowcake product. Ammonia generated from the calcined off gas is scrubbed and also returned to stripping make-up.

Conditions in extraction may be controlled to ensure the saline barren solution contains less than 10 ppm $U_3O_8$. In cases where clarified solutions are used; barren solutions may be recycled back to leaching or comminution. In cases were leached pulps are used; barren pulps may be neutralised and sent to tailings. Here a portion of the solution may be recycled back into the process.

Two embodiments of the method according to the invention are discussed below with reference to FIGS. 1 and 2.

Figure 2:
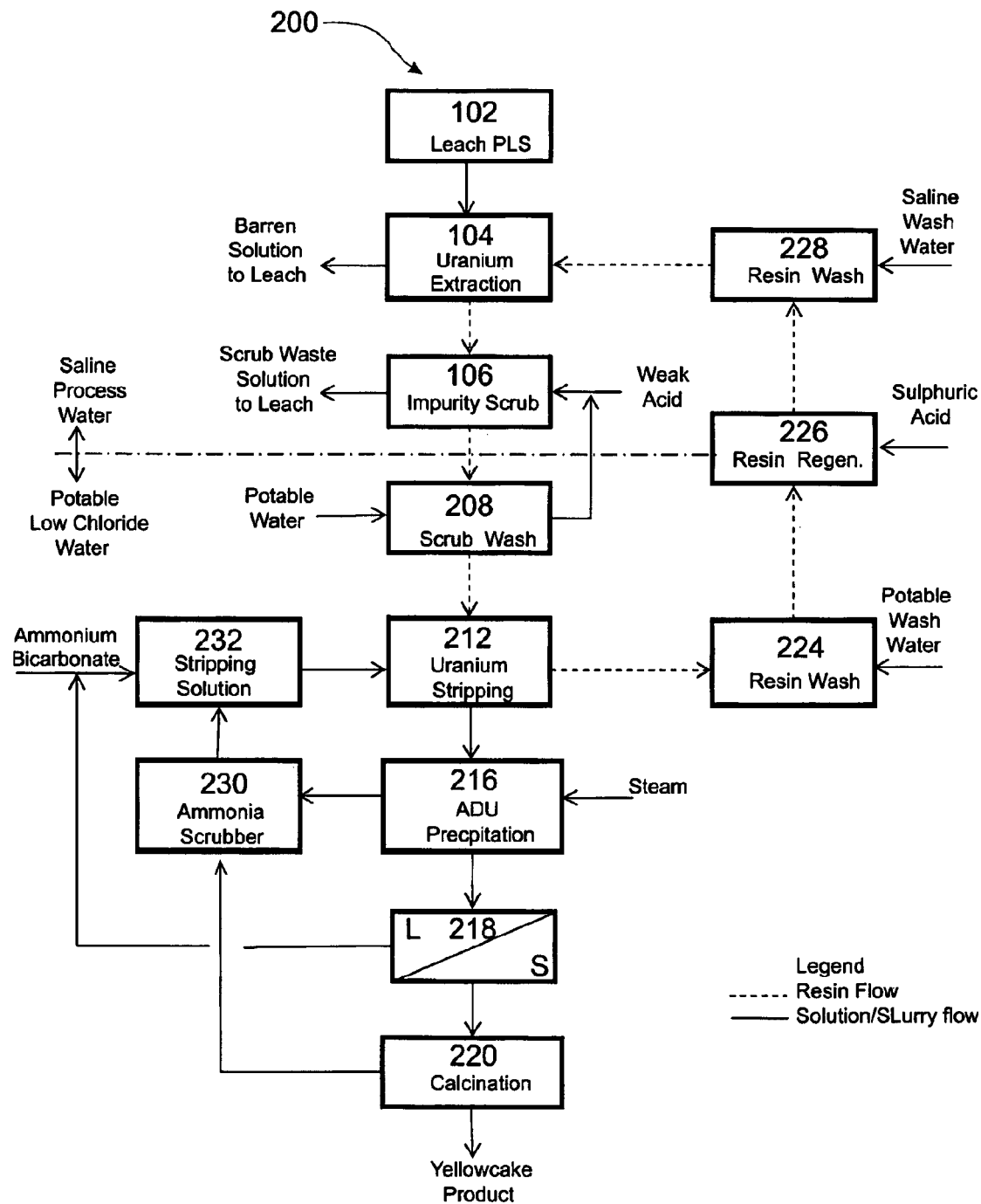
FIG. 2: is a flow diagram showing one embodiment of the method of recovering uranium of the invention with ammonium carbonate/ammonium bicarbonate.

FIG. 1 shows one method 100 according to the invention in which sodium carbonate is used as the ion exchange stripping agent and FIG. 2 shows an embodiment in which ammonium bicarbonate is used as the stripping agent.

Both methods include steps 102 leach the pregnant leach solution and 104 uranium extraction after which the barren solution is returned to leach.

In step 102 acidic saline pregnant leach solution, typically containing between 50-1000 ppm $U_3O_8$, is contacted with an amino-phosphorus resin to selectively extract uranium from solution. The leach lixiviant will in most cases be sulphuric acid. In method 100 conditions are controlled to ensure the saline barren solution contains less than 5-10 ppm $U_3O_8$ before it is recycled to the comminution or leach circuit as process water. In method 200 conditions are controlled to ensure the saline barren solution contains less than 10 ppm $U_3O_8$ before it is recycled to the comminution or leach circuit as process water.

Method 100 shown in FIG. 1 provides a process for extraction and recovery of uranium from saline or hyper-saline solutions and pulps using an amino-phosphorus resin and stripping using a reagent such as carbonate, bicarbonate or nitrate.

Prior to stripping and scrubbing, the resin is washed in step 128 to remove any solid particulates on the resin from the extraction stage.

As shown in FIG. 1, method 100 also includes step 106 of a scrubbing impurities. In the embodiment shown weak acid is used. The scrubbing step serves to scrub minor impurities such as, iron, vanadium, zirconium or thorium, which may also co-load onto the resin and these can be scrubbed by contacting the loaded resin with a solution of weak sulphuric acid or a reducing acid such as sulphurous acid in the case of removing iron. Dilute sulphuric acid will remove minimal uranium from the resin. As noted above, the scrub step is optional depending on the amount of impurities present.

In step 108 the resin is washed to remove impurities. In the embodiment shown in FIG. 1 saline wash water is used to remove any entrained scrub solution. The spent scrub solution is normally sent to leach, as it can contain some residual acid and a small amount of uranium.

In step 110 sodium carbonate is generated by adding sodium hydroxide to the product solution to form SDU.

In step 112 the uranium is stripped from the resin with a stripping reagent, such as sodium carbonate or ammonium carbonate, to remove uranium from the resin as uranyl carbonate.

In step 116 the product solution containing uranyl carbonate is precipitated with sodium hydroxide to form sodium diuranate (SDU). This point in the FIG. 1 provides the segregation between saline and low chloride water within the circuit. The resulting SDU precipitate is filtered and washed with potable water, which segregates the circuit from saline process conditions.

In step 117 carbon dioxide is contacted with the SDU filtrate to convert all excess sodium hydroxide into sodium carbonate.

In step 118 the sodium diuranate solid is separated from the liquid phase in a solid/liquid separation step, typically consisting of a clarifier or thickener.

Step 120 is a releach step in SDU. SDU precipitate is repulped in low chloride water and dissolved in sulphuric acid. The resulting uranyl sulphate is precipitated with hydrogen peroxide to form a uranyl peroxide product. Sodium hydroxide is used to maintain pH at the optimum peroxide precipitation conditions. Final uranyl peroxide product is thickened, filtered and dried.

In step 122 the uranyl peroxide product is precipitated by adding hydrogen peroxide and sodium hydroxide. Sodium hydroxide is used to maintain pH at the optimum peroxide precipitation conditions. Final uranyl peroxide product is thickened, filtered and dried.

The barren resin is then washed in step 124 with saline wash water to remove any entrained sodium carbonate. The resulting weak stripping solution is then recycled to stripping solution make-up.

In step 126 the washed, barren resin is regenerated to the sulphate form using dilute sulphuric acid before being returned to uranium extraction. After this step, in step 128 the resin may be washed with saline wash water to remove excess regeneration solution. The resulting weak regeneration solution may be recycled to regeneration solution make up.

The final regenerated resin is then returned to the extraction stage 104 for uranium recovery.

FIG. 2 shows method 200 which is another embodiment of the invention.

Prior to stripping and scrubbing, the resin is washed in step 228 to remove any solid particulates on the resin from the extraction stage.

The second embodiment, method 200 shown in FIG. 2 is an alternative arrangement for extraction and recovery of uranium from saline or hyper-saline solutions and pulps using an amino-phosphorus resin and stripping using ammonium bicarbonate/carbonate.

As shown in FIG. 2, method 200 also includes step 106 of scrubbing impurities.

In step 208 the resin is washed to remove impurities. Once the major impurities have been scrubbed in step 208 shown in FIG. 2, the loaded resin is washed with potable or low chloride water to ensure no or a low amount chlorides are entrained. This point in method 200 provides the segregation between saline and low chloride within the circuit.

In 212 the resin is then stripped with an ammonium bicarbonate and ammonium carbonate mixture. This produces an ammonium uranyl tricarbonate product solution.

In 224 barren resin is then washed with low chloride water to recover any entrained ammonium carbonate for reagent make-up in stripping. Washed barren resin must be regenerated to its sulphate form before returning to uranium Extraction. This is achieved by contacting the resin with diluted sulphuric acid in 226. After regeneration, the resin is washed with saline water in 228 to recover any entrained sulphuric acid. The resulting weak acid is recycled as regeneration make-up solution or to leach as process water. The final regenerated resin is then returned to Extraction 104 for uranium recovery.

Following stripping, in 216 ammonium uranyl tricarbonate solution is heated with steam to precipitate ammonium diuranate (ADU) and generate ammonia and carbon dioxide gas. Vapour is recovered via a packed bed scrubber for recycling to stripping along with the barren ADU solution after solid-liquid separation.

The ADU is calcined in 220 to produce final yellowcake product. Ammonia generated from the calcined off gas is scrubbed in 230 and also returned to stripping make-up in 232.

Produced uranium-rich product solutions from method 100, 200 of the present invention can be integrated with well-known and established product recovery circuits to produce a yellowcake product.

The following non-limiting example illustrates the invention. The example should not be construed as limiting: the example is included for the purposes of illustration only. The Example will be understood to represent an exemplification of the invention.

Example

A synthetic 60 ppm U ISL uranium solution was prepared using seawater containing 20 g/L chloride. This solution was pumped in an upward flow through a fixed bed ion exchange column loaded with Clean TeQ R600Cl amino-phosphonic resin. Synthetic ISL solution was continuously pumped through the IX column until the barren IX uranium concentration matched the feed uranium concentration. This indicated the resin had reached equilibrium uranium loading. Analysis of the loaded resin was performed as shown in Table 1.

TABLE 1

Analysis of synthetic ISL solution and R600Cl loaded resin.

| Analysis | Concentration | | | | | |
|---|---|---|---|---|---|---|
| | U ppm | Na g/L | Ca ppm | Mg g/L | $Cl^-$ g/L | $S^-$ ppm |
| ISL Solution | 101 | 10.5 | 395 | 1.2 | 20.2 | 923 |
| Load Resin | 29,441 | | | | | |

The present invention is of significant advantage because it allows the extraction of uranium from acidic leach liquors and pulps where the concentration of chloride in solution is higher than 3 g/L. Prior to the present invention this was not possible. The consequence of this is the recovery of uranium is now possible using saline, hyper-saline or seawater without the need for desalination or solvent extraction.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All computer programs, algorithms, patent and scientific literature referred to herein is incorporated herein by reference.

REFERENCES

Gupta, C. K., & Singh, H. (2003). Uranium Resource Processing: Secondary Resources. Heidelberg: Springer-Verlag.
International Atomic Energy Agency, (1993). Uranium Extraction Technology. Vienna: IAEA International Atomic Energy Agency, (2001). Manual of acid in situ leach uranium mining technology, IAEA-TECDOC-1239, Vienna: IAEA.
La Brooy S, Spratford D and Middlin B, Differentiating the Honeymoon Uranium Process Flowsheet. ALTA Conference Proceedings, Perth, Western Australia, 2009.

The invention claimed is:

1. A method comprising: recovering uranium from an acidic leach solution or acidic leach pulp in salt water using an amino-phosphorus resin, wherein a liquid phase of the leach solution or leach pulp contains greater than 3 g/L chloride ion in solution.

2. The method of claim 1, wherein the resin comprises a functional group comprising an amino phosphonic group, an amino-phosphinic group, an amino phosphoric functional group and/or a combination thereof.

3. The method of claim 1, wherein the leach solution or leach pulp is generated by in-situ leaching, vat leaching, heap leaching and/or agitated leaching at ambient, elevated temperature and/or elevated pressure conditions in saline or hyper-saline water.

4. The method of claim 1, wherein the leach solution or leach pulp is obtained by leaching uranium bearing ore with an acid.

5. The method of claim 1, wherein a source of chloride ion originates from addition of a reagent.

6. The method of claim 1, wherein uranium-loaded resin formed by recovering uranium from the leach solution using the resin is stripped with a stripping reagent to a form an uranium rich product solution and barren resin.

7. The method of claim 6, wherein the stripping reagent is selected from water, saline, a carbonate salt, a bicarbonate salt, a sulphate salt, a sulphuric acid, a nitrate salt, a nitric acid or a combination of these.

8. The method of claim 7, wherein the carbonate salt includes sodium carbonate generated through precipitation of sodium diuranate (SDU) from the uranium rich product solution.

9. The method of claim 8, wherein sodium diuranate (SDU) filtrate formed by precipitation of sodium diuranate from the uranium rich product solution is contacted with carbon dioxide.

10. The method of claim 7, wherein the carbonate salt includes ammonium carbonate, which is generated by carbonation of ammonia from ammonium diuranate (ADU) production from the uranium rich product solution.

11. The method of claim 1, wherein an impurity loaded on the amino-phosphorus resin is scrubbed or selectively stripped using a dilute sulphuric acid, sulphurous acid, and/or water.

12. The method of claim 6, further comprising precipitating a uranyl peroxide product by adding hydrogen peroxide and/or sodium hydroxide to uranyl sulphate formed from sodium diuranate (SDU) preciptitated from the uranium rich product solution.

13. The method of claim 6, further comprising producing yellowcake product by calcining ammonium diuranate (ADU) precipitated from the uranium rich product solution.

14. The method of claim 6, further comprising washing the barren resin with water or high chloride water.

15. The method of claim 6, wherein the barren resin is regenerated to its sulphate, chloride, or nitrate form by contacting the barren resin with a solution of sulphuric acid, sulphate salt, hydrochloric acid, chloride salt, nitric acid, nitrate salt or a combination of these.

* * * * *